(12) United States Patent
Kim (10) Patent No.: US 7,665,913 B2
(45) Date of Patent: Feb. 23, 2010

(54) PORTABLE TERMINAL WITH CAMERA COVER

(75) Inventor: Kyung-Chul Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 587 days.

(21) Appl. No.: 11/487,198

(22) Filed: Jul. 14, 2006

(65) Prior Publication Data

US 2007/0025726 A1 Feb. 1, 2007

(30) Foreign Application Priority Data

Aug. 1, 2005 (KR) ...................... 10-2005-0070406

(51) Int. Cl.
*G03B 17/00* (2006.01)
*G03B 17/02* (2006.01)

(52) U.S. Cl. ..................... 396/448; 396/539; 455/575.4

(58) Field of Classification Search ................. 396/348, 396/439, 448, 535, 539, 429; 455/575.4
See application file for complete search history.

(56) References Cited

U.S. PATENT DOCUMENTS

| | | | | |
|---|---|---|---|---|
| 4,032,940 A | * | 6/1977 | Chan | ........................... 396/348 |
| 5,640,641 A | * | 6/1997 | Balling | ........................ 396/535 |
| 5,708,891 A | * | 1/1998 | Ando et al. | ................. 396/448 |
| 6,264,378 B1 | * | 7/2001 | Katoh et al. | ................ 396/348 |
| 6,278,846 B1 | * | 8/2001 | Kobayashi et al. | .......... 396/178 |
| 6,287,021 B1 | * | 9/2001 | Katoh et al. | ................ 396/348 |
| 6,347,893 B1 | * | 2/2002 | Shiono et al. | ............... 396/448 |
| 6,397,012 B1 | * | 5/2002 | Nishimura et al. | .......... 396/176 |
| 6,491,448 B2 | * | 12/2002 | Tanaka | ........................ 396/348 |
| 6,554,497 B2 | * | 4/2003 | Kobayashi et al. | .......... 396/348 |
| 6,796,727 B2 | * | 9/2004 | Tanabe | ........................ 396/448 |
| 7,050,714 B2 | * | 5/2006 | Yamane | ....................... 396/177 |
| 7,239,806 B2 | * | 7/2007 | Chen | ........................... 396/301 |
| 7,438,486 B2 | * | 10/2008 | Ho | .............................. 396/448 |
| 7,480,005 B2 | * | 1/2009 | Jeon | ............................ 348/373 |

FOREIGN PATENT DOCUMENTS

JP 2003-033933 * 2/2003

* cited by examiner

*Primary Examiner*—Christopher Mahoney
(74) *Attorney, Agent, or Firm*—The Farrell Law Firm, LLP (57) ABSTRACT

Disclosed is a portable terminal with a camera lens provided on the housing of the terminal. The portable terminal includes a first guide member installed on the housing of the terminal at a position adjacent to the camera lens; a cover member having one or more guide rods, which are slidably joined with the first guide member, whereby the cover member slides on the housing so as to open or close the camera lens; one or more first stoppers formed on the first guide member; and second stoppers formed at the opposite ends of the cover member. When the cover member completely opens or closes the camera lens, the second stoppers formed on one of the opposite ends of the cover member are engaged with the first stoppers, thereby restricting the movement of the cover member.

7 Claims, 8 Drawing Sheets

PORTABLE TERMINAL WITH CAMERA COVER

PRIORITY

This application claims priority to an application entitled "Portable Terminal with Camera Cover" filed with the Korean Intellectual Property Office on Aug. 1, 2005 and assigned Serial No. 2005-70406, the contents of which are incorporated herein by reference.

BACKGROUND OF THE INVENTION

1. Field of the Invention

The present invention relates to a portable terminal, and in particular, to a cover for a camera lens of a portable terminal.

2. Description of the Related Art

Typically, a portable terminal is an appliance for providing wireless user-to-user communication or user-to-service provider communication, allowing a user to enjoy various services including voice communication, short message service, multimedia service, entertainment services, etc.

Depending on external appearance, portable terminals are classified into: a bar type terminal, which has a transmitter, a receiver a data input device, a data output device, etc. installed in a single housing; a flip type terminal, which has a transmitter, a receiver, a data input device, a data output device, etc. installed in a single housing, like the bar type terminal but with a flip cover connected to the housing so as to open or close the data input device such as a key pad; and a folder type terminal, which has a pair of housings foldably connected to one another, with a transmitter, a receiver, a data input device, a data output device, etc. being properly distributed over and installed in the pair of housings.

Recently, due to the varying tastes of consumers, sliding type, pop-up type and swing type terminals have appeared and are on the market. These portable terminals will be easily appreciated by those skilled in the art.

As the designs and functions of portable terminals are diversified, camera lenses occupy a position not as an optional element but as an essential element mounted on the portable terminals. Moreover, as the function of camera lenses improves, a cover device is required so as to prevent the exposure to the outside of a camera lens while the camera lens is not in use.

However, the separate installation of a cover for opening or closing a camera lens adversely affects the design of a terminal. Furthermore, it is troublesome to separately provide components for installing a camera cover on a terminal. Moreover, measurements for securing the structural stability of such a camera cover are practically insufficient.

SUMMARY OF THE INVENTION

Accordingly, the present invention has been made to solve the above-mentioned problems occurring in conventional terminals, and an object of the present invention is to provide a portable terminal with a camera cover which is harmonious in design with the terminal.

Another object of the present invention is to provide a portable terminal with a camera cover which is easy to install and can secure the structural stability in the terminal.

In order to achieve the above-mentioned objects, there is provided a portable terminal with a camera lens that is provided in the housing of the terminal, which includes a first guide member installed on the housing of the terminal at a position adjacent to the camera lens; a cover member having one or more guide rods, which are slidably joined with the first guide member, whereby the cover member slides on the housing so as to open or close the camera lens; one or more first stoppers formed on the first guide member; and second stoppers formed at opposite ends of the cover member, wherein when the cover member completely opens or closes the camera lens, the second stoppers formed on one of the opposite ends of the cover member are engaged with the first stoppers, thereby restricting the movement of the cover member.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description, a detailed description of known functions and configurations incorporated herein will be omitted to avoid making the subject matter of the present invention unclear.

Figure 1:
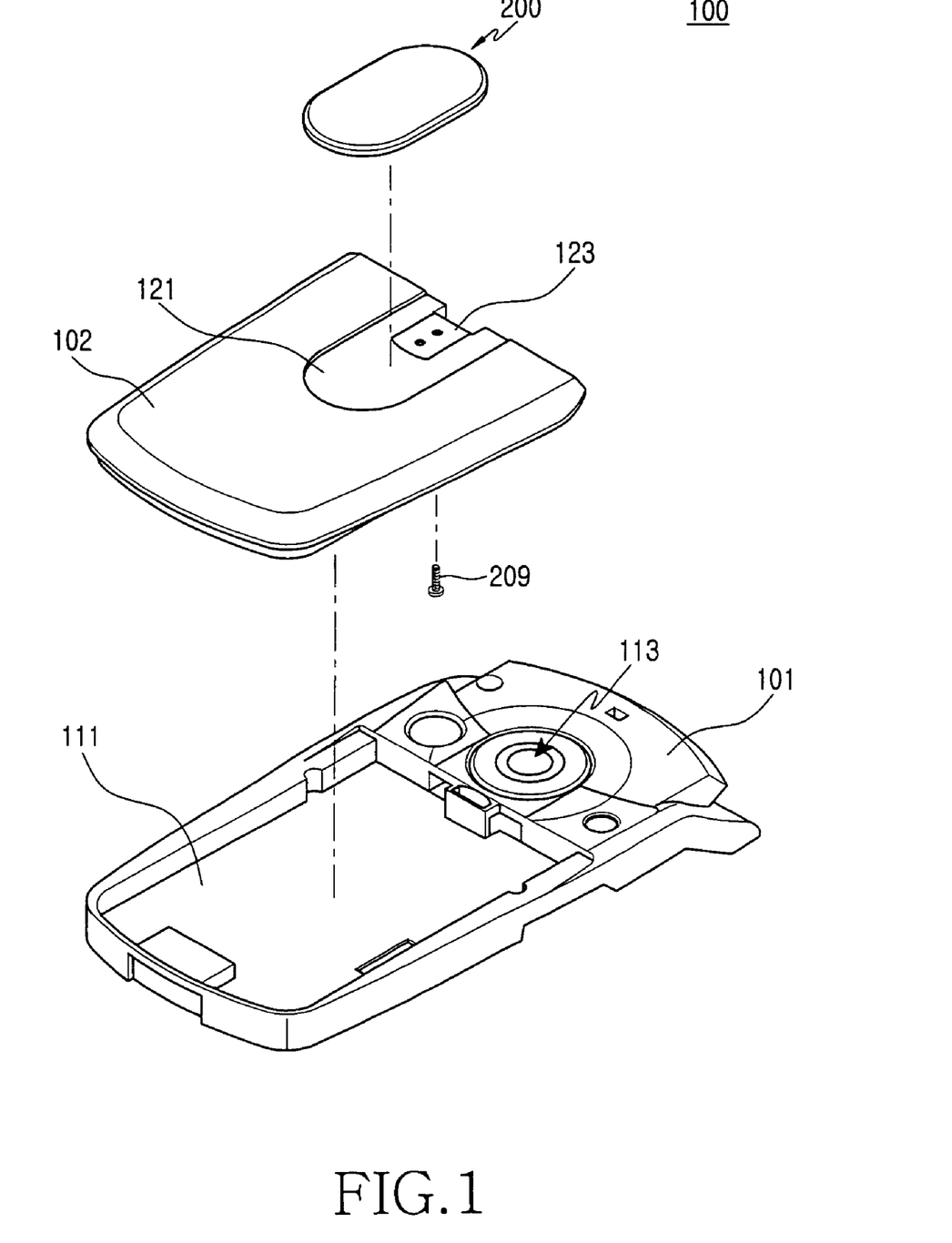
FIG. 1 is an exploded perspective view of a portable terminal with a camera cover according the present invention.
Figure 2:
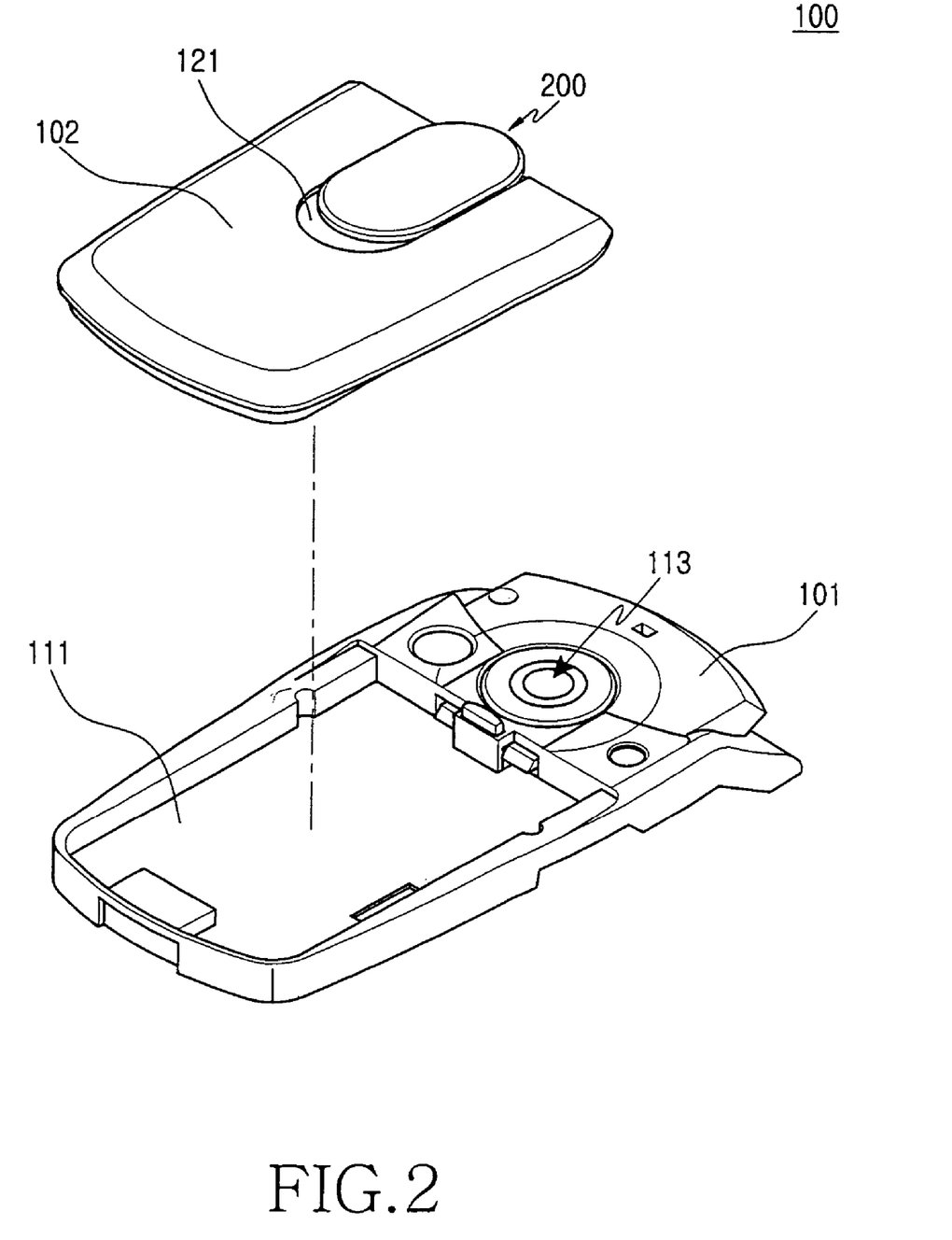
FIG. 2 is an exploded perspective view showing the appearance of the camera cover shown in FIG. 1 mounted on the battery pack.

FIGS. 1 and 2 are exploded perspective views of a portable terminal 100 with a camera cover 200 according to the present invention. As shown in FIGS. 1 and 2, the portable terminal 100 with the camera cover 200 has a housing 101 formed with a battery mounting recess 111 so as to provide a space for mounting a battery pack 102, and a camera lens 113 is installed at a position adjacent to the mounting recess 111. The camera cover 200 is configured to be mounted on the battery pack 102, which is removably fitted into the mounting recess 111.

Figure 3:
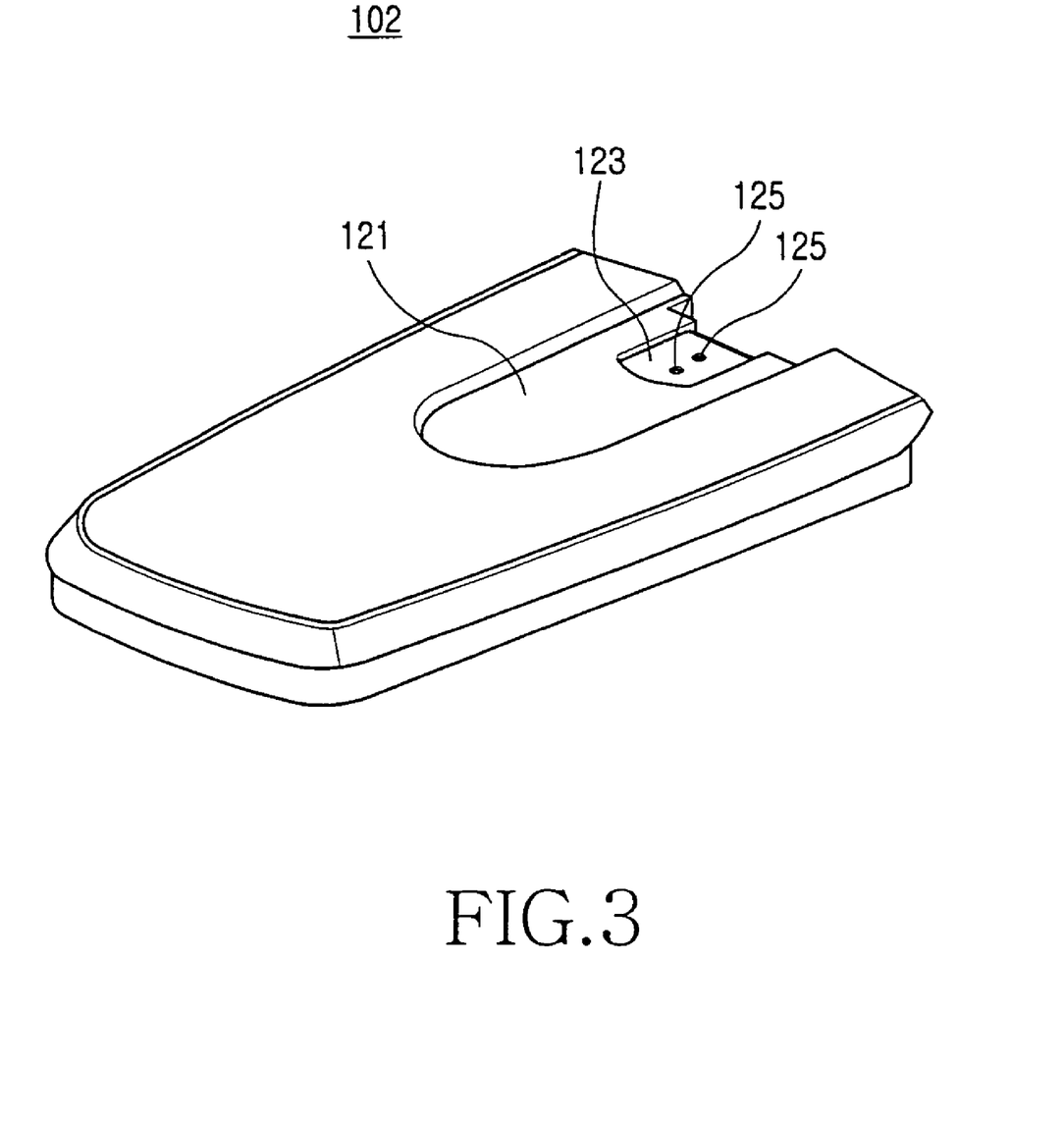
FIG. 3 is a perspective view of the battery pack installed on the portable terminal shown in FIG. 1.

In order to install the camera cover 200, there is provided a cover recess 121 and a seating recess 123 on the outer surface of the battery pack 102. The seating recess 123 provides a space for mounting a first guide member 202 (FIG. 4), which is a component of the camera cover 200, and the cover recess 121 provides a space for allowing a cover member 201 to slide. As shown is FIG. 3, plural screw holes 125 are formed in the seating recess 123 so as to fasten the first guide member 202.

Figure 4:
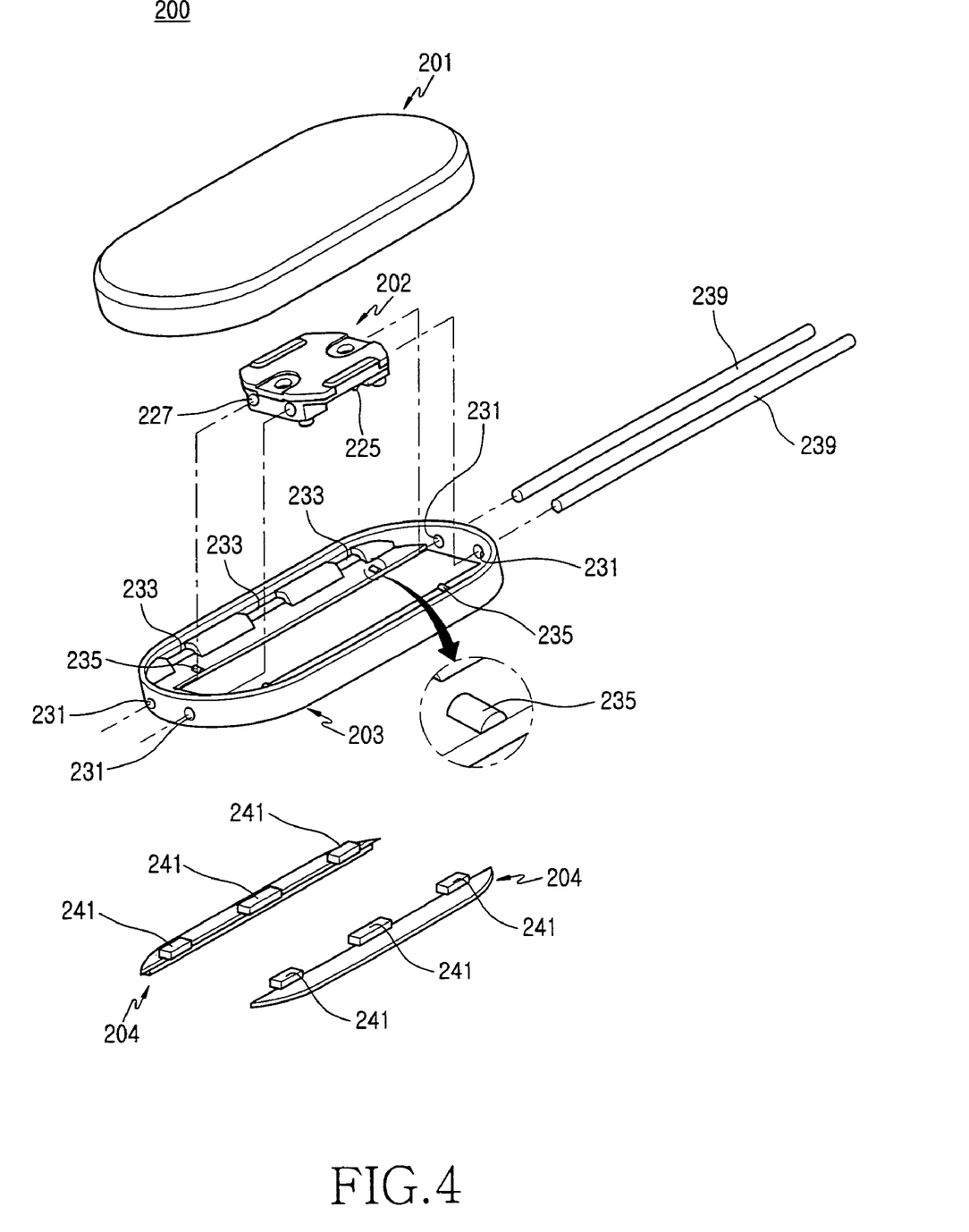
FIG. 4 is an exploded perspective view of the camera cover shown in FIG. 1.

As shown in FIG. 4, the camera cover 200 comprises a cover member 201, the first guide member 202 and a second guide member 203.

The cover member 201 is slidably mounted on the battery pack 102 through the first guide member 202 and the second guide member 203, thereby allowing for opening or closing of the camera lens 113. Because the cover member 201 directly makes up the appearance of the terminal, the cover member 201 is designed to be in harmony with the design of the terminal and can be used as a component for decorating the housing 101 of the terminal.

The first guide member 202 is mounted on the seating recess 123 formed on the battery pack 102. The first guide member 202 is formed with screw holes 224a, 224b (see FIG. 5) which correspond to the screw holes 125 (FIG. 3) formed on the battery pack 102. In the camera cover 200 according to the present embodiment, the first guide member 202 is fastened to the battery pack 102 by screws 209 (shown in FIG. 1). The first guide member 202 may be mounted on the battery pack 102 through a suitable process such as adhering, welding, etc. that can be selected by one skilled in the art by considering the manufacturing costs, readiness of process, etc. Meanwhile, the first guide member 202 is provided for guiding the sliding movement of the cover member 201 and is preferably formed from a synthetic resin material in order to assure the smooth sliding movement. As the synthetic material for fabricating the first guide member 202, polyoxymethylene (POM) is preferred for its superior mechanical characteristics such as strength, endurance, etc.

Figure 5:
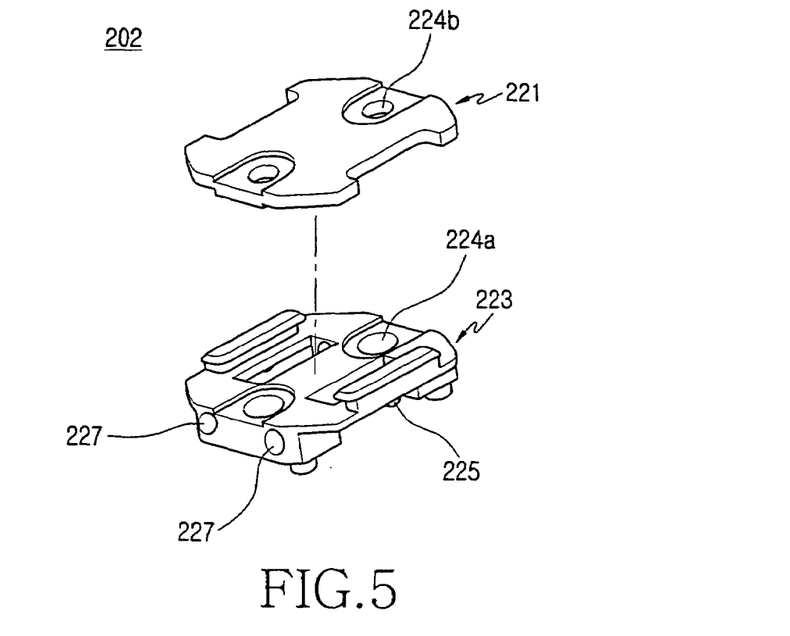
FIG. 5 is an exploded perspective view of the first guide member shown in FIG. 4.

If the first guide member 202 is only formed from the synthetic resin, the threads formed in the synthetic resin are apt to fracture when fastening the screws 209 to the battery pack 102. Therefore, the parts for guiding the sliding movement of the cover member 201 in the guide member 202 may be formed from a injection-molded synthetic resin member 223 and a reinforcement member 221 formed from a metallic material that may be mounted on one side of the injection-molded member 223, so as to provide wear resistance or the like, as shown in FIG. 5. The injection-molded member 223 and the reinforcement member 221 are preferably fabricated by insert injection-molding. Insert injection-molding is a process for fabricating a part with a synthetic resin material, in which a metallic reinforcement material is installed within a mold, so that the reinforcement material is embedded in the injection-molded material during the injection-molding process. It is preferable that the screws 209 for fastening the first guide member 202 to the battery pack 102 are sequentially joined from the battery pack 102 to the injection-molded member 223 and the reinforcement member 221.

The second guide member 203 is assembled to the inner side of the cover member 201 to wrap the opposite sides of the first guide member 202, so that the second guide member 203 slides on the first guide member 202. In order to more stably guide the sliding movement of the second guide member 203, the camera cover 200 may be provided with one or more guide rods 239.

A pair of the guide rods 239 are provided and the opposite ends of the guide rods 239 are anchored to fixing holes 231 formed on the second guide member 203, respectively. The first guide member 202 is formed with guide holes 227 (see FIG. 5), the number of which corresponds to the number of the guide rods 239. The guide rods 239 are slidably joined through the guide holes 227, respectively.

As the second guide member 203 and the guide rods 239 slide on the first guide member 202 in the state in which they are fixed to the cover member 202, the cover member 201 slides on the battery pack 102 and the housing 101 of the terminal 100.

Buffer members 204 may be mounted on the second guide member 203. The buffer members 204 suppress abrasion and noise which may occur as the inner surfaces of the cover member 201 and the outer surfaces of the battery pack 102 and the terminal housing 101 directly rub against each other. The buffer members 204 are formed from an elastic material such as silicon and urethane, and restrict the direct friction between the cover member 201 and the outer surfaces of the battery pack 102 or the like. In addition, the buffer members 204 provide frictional force in relation to the outer surface of the battery pack 102 or the terminal housing 101, thereby restricting the movement of the cover member 201 on the terminal housing 101. That is, if the user locates the cover member 201 at an intended position, the movement of the cover member 201 is restricted. In order to assemble the buffer members 204 with the second guide member 203, the second guide member 203 is formed with connection holes 233 and the buffer members 204 are formed with connection projections 241.

In a resultant article, the second guide member 203 itself may be formed of an elastic material, thereby also serving as the buffer members. However, considering the fact that the second guide member 203 should support the opposite ends of the guide rods 239 and slide on the first guide member 202, it is preferable that the second guide member 203 is formed from a rigid synthetic resin.

In order to assure that the cover member 201 can more stably retain the state of completely opening or closing the camera lens 103, the camera cover 200 is provided with first stoppers 225 and second stoppers 235.

The first stoppers 225 are respectively formed at one end of the bottom of the first guide member 202 to be laterally spaced, and the second stoppers 235 are formed in pairs adjacent to the opposite ends of the second guide member 203. As the cover member 201 slides on the first guide member 202, the second stoppers 235 selectively confront with the bottom of the first guide member 202.

Figure 6:
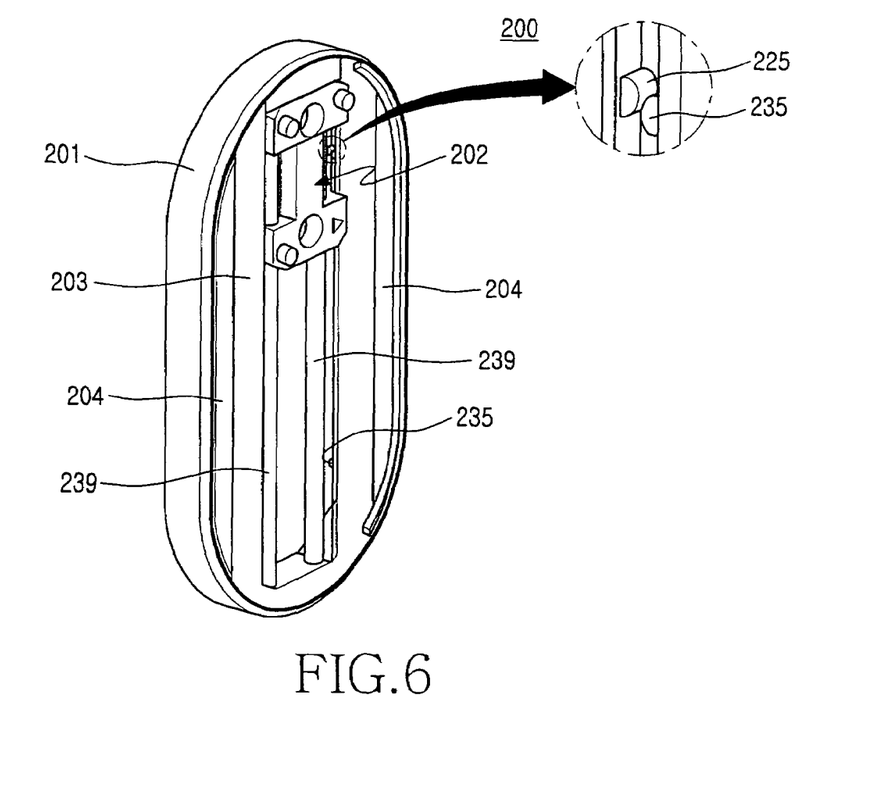
FIGS. 6 to 8 are perspective views showing the operation of the camera cover shown in FIG. 4 in sequence.
Figure 7:
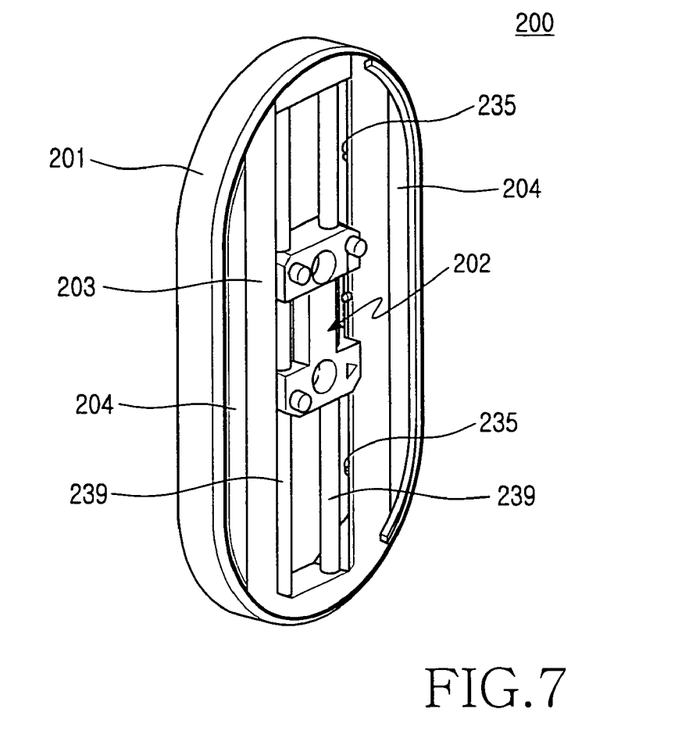
Figure 8:
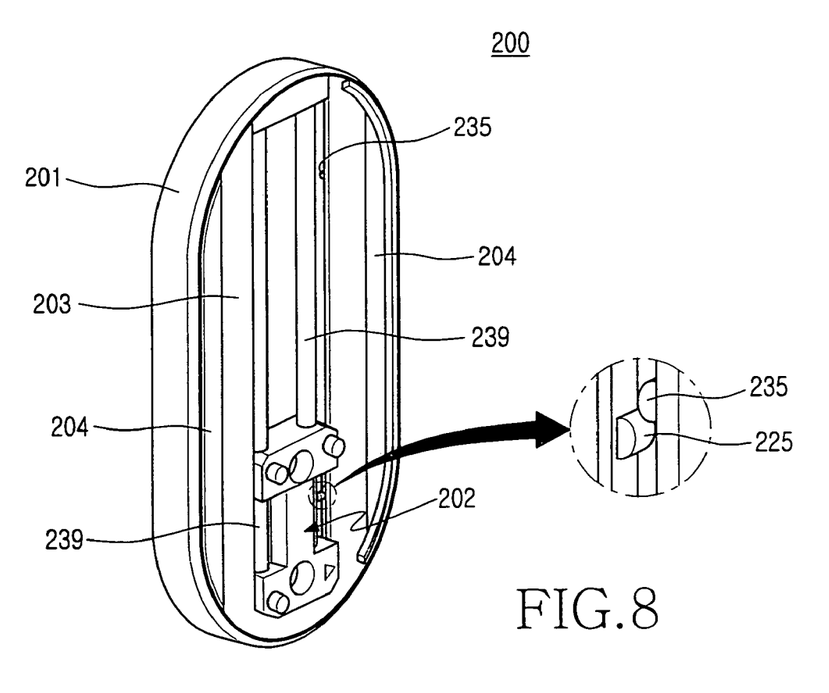
Figure 9:
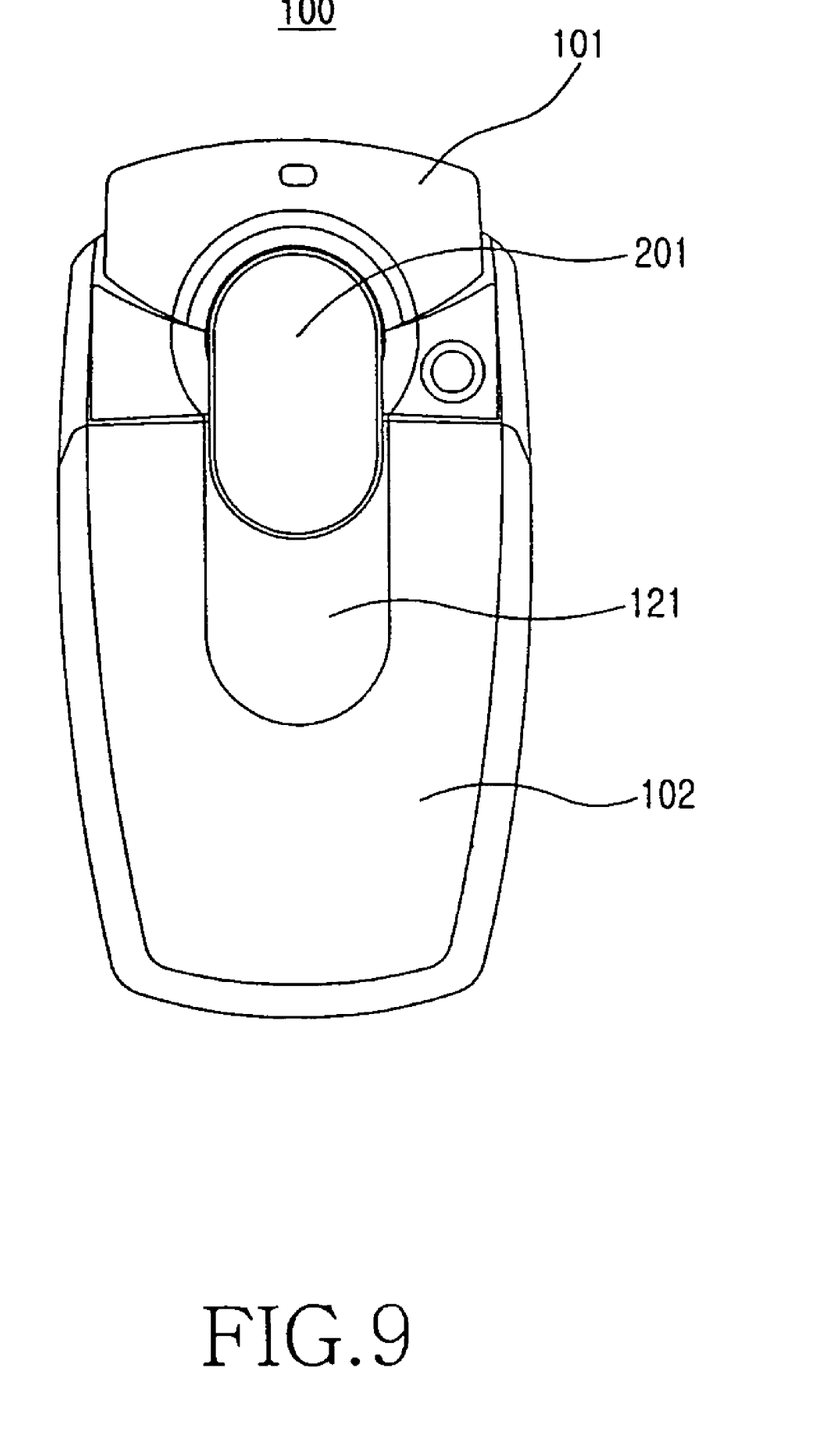
FIG. 9 shows the appearance of the camera cover shown in FIG. 4 in the state of closing the camera lens mounted on the terminal.
Figure 10:
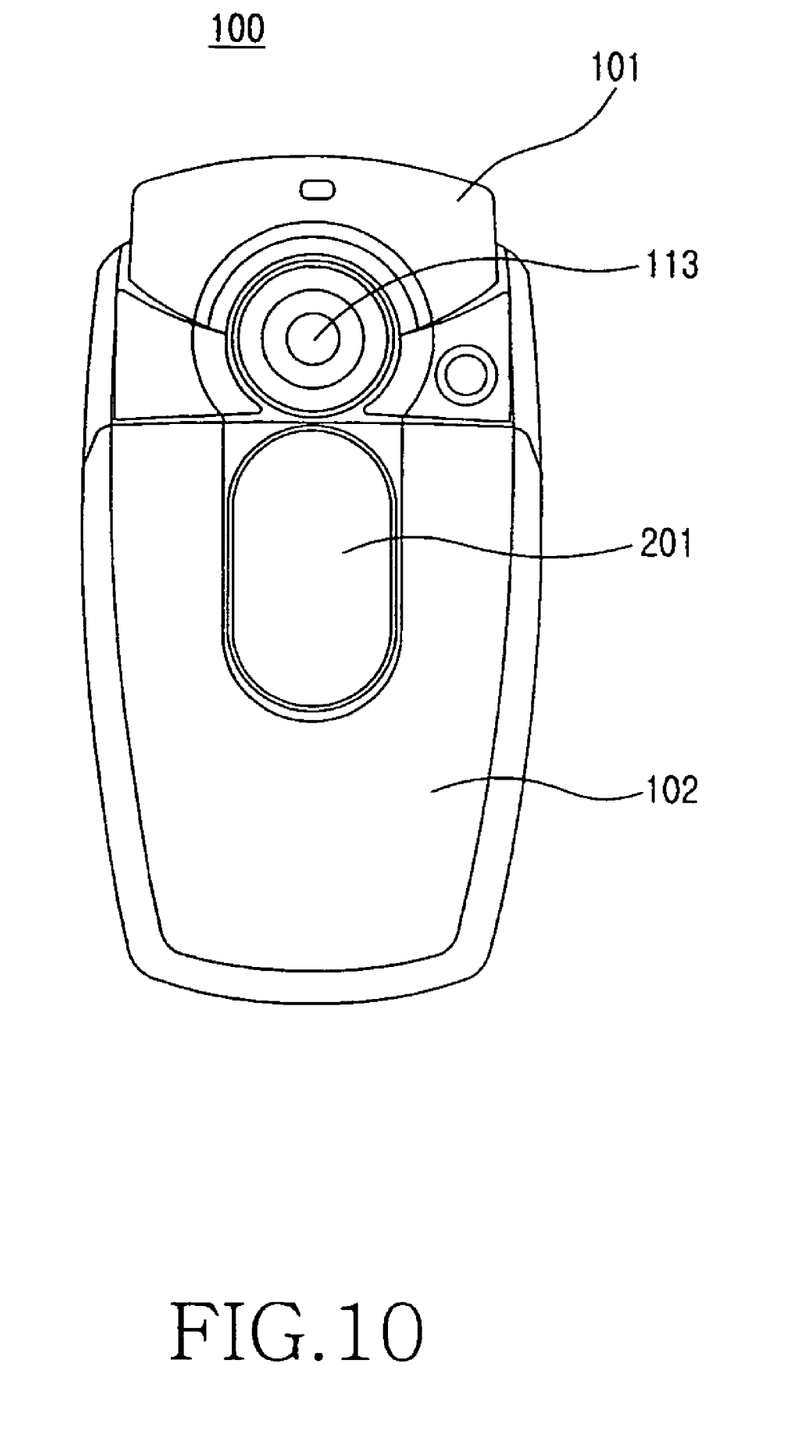
FIG. 10 shows the appearance of the camera cover shown in FIG. 4 in the state of opening the camera lens mounted on the terminal.

FIGS. 6 to 8 show the slide movement of the cover member 201 guided by the first and second guide members 202 and 203 and guide rods 239 in sequence. FIGS. 9 and 10 show the camera lens 113 being opened and closed as the cover member 201 is slid. If the cover member 201 fully moves in one direction or the other on the first guide member 202 and completely opens or closes the camera lens 113, the first stoppers 225 are engaged with corresponding second stoppers 235 and positioned between the second stoppers 235 and the corresponding end of the cover member 201. If it is assumed that the camera lens is completely opened as the cover member 201 moves in the one direction and the first and second stoppers 225 and 235 are engaged with each other, the cover member 201 is restricted by the cover recess 121 in moving in the one direction and is also restricted by the first and second stoppers 225 and 235 in moving in the other direction. Accordingly, when the camera lens 113 is completely opened, the cover member 201 can be stably retained in fixed condition. Likewise, when the cover member 201 completely closes the camera lens 113, the space for allowing the cover member 201 to further move in the direction of closing the camera lens 113 is limited and the first and second stoppers 225 and 235 are engaged with each other, thereby restricting the movement of the cover member 201.

As described above, the inventive camera cover is provided in a portable terminal in such a way that the camera cover is harmonious in design with the portable terminal. Therefore, even if the camera cover is provided in the portable camera, it is possible to use the camera cover for decorating the housing of the terminal without adversely affecting the design of the terminal. In addition, because the camera cover is fabricated in a modular form and one of the guide members is mounted on the terminal housing or battery pack, there is an advantage in that the camera cover is easy to mount and structurally stable.

While the invention has been shown and described with reference to certain preferred embodiments thereof, various changes and modifications can be made without departing from the scope and spirit of the present invention as defined by the appended claims. For example, although it is described in the description of preferred embodiments that the camera cover is mounted on the battery pack by way of an example, it is not necessary to mount the camera cover on the battery pack. Rather, if it is possible to secure a space for allowing the cover member to slide, it is possible to mount the cover member at any position adjacent to the camera lens.

Therefore, the scope of the present invention shall be determined by the appended claims and equivalents thereof rather than by the embodiments described above.

What is claimed is:

1. A portable terminal with a camera lens provided in a housing of the terminal, the portable terminal comprising:
   a first guide member installed on the housing of the terminal at a position adjacent to the camera lens;
   a cover member;
   one or more guide rods for slidably joining the cover member and the first guide member, whereby the cover member slides on the housing so as to open or close the camera lens;
   one or more first stoppers formed on the first guide member;
   second stoppers formed at opposite ends of the cover member, wherein when the cover member completely opens or closes the camera lens, the second stoppers engage the first stoppers, thereby restricting movement of the cover member; and
   a cover recess formed on an outer surface of a battery pack mounted in a mounting recess on one side of the terminal housing, and a seating recess formed on the cover recess, wherein as the first guide member is mounted in the seating recess, the cover member slides along the cover recess.

2. The portable terminal as claimed in claim 1, wherein the camera lens is installed adjacent to the mounting recess and the cover member is installed on the battery pack.

3. The portable terminal as claimed in claim 1, further comprising a second guide member mounted within the cover member, and opposite ends of each guide rod are supported by the second guide member.

4. The portable terminal as claimed in claim 1, wherein the first guide member is formed with one or more guide holes, through which the guide rods are capable of sliding.

5. The portable terminal as claimed in claim 1, wherein the first guide member comprises:
   an injection-molded member of synthetic resin, to which the guide rods are slidably joined; and
   a metallic reinforcement member mounted on one side of the injection-molded member.

6. A portable terminal with a camera lens provided in a housing of the terminal, the portable terminal comprising:
   a first guide member installed on the housing of the terminal at a position adjacent to the camera lens;
   a cover member;
   one or more guide rods for slidably joining the cover member and the first guide member, whereby the cover member slides on the housing so as to open or close the camera lens;
   one or more first stoppers formed on the first guide member;
   second stoppers formed at opposite ends of the cover member, wherein when the cover member completely ovens or closes the camera lens, the second stoppers engage the first stoppers, thereby restricting movement of the cover member; and
   one or more buffer members, fitted into the cover member to provide frictional force in relation to an outer surface of the terminal housing.

7. The portable terminal of claim 6, wherein the one or more buffer members prevent the outer surface from being abraded by the cover member.

* * * * *

UNITED STATES PATENT AND TRADEMARK OFFICE
CERTIFICATE OF CORRECTION

| | | |
|---|---|---|
| PATENT NO. | : 7,665,913 B2 | Page 1 of 1 |
| APPLICATION NO. | : 11/487198 | |
| DATED | : February 23, 2010 | |
| INVENTOR(S) | : Kyung-Chul Kim | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 811 days.

Signed and Sealed this

Seventh Day of December, 2010

David J. Kappos
*Director of the United States Patent and Trademark Office*